Aug. 21, 1962     H. C. SONTAG     3,049,925
CABIN PRESSURE SCHEDULE DEVIATION INDICATOR
Filed Feb. 8, 1960

Inventor
HARCOURT C. SONTAG

United States Patent Office 3,049,925
Patented Aug. 21, 1962

3,049,925
CABIN PRESSURE SCHEDULE DEVIATION
INDICATOR
Harcourt C. Sontag, 4717 37th St. N., Arlington 7, Va.
Filed Feb. 8, 1960, Ser. No. 7,496
4 Claims. (Cl. 73—407)
(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft cabin pressure error indicator and more particularly to an indicator which will indicate the deviation of pressure within an aircraft cabin from a predetermined schedule of pressures to be maintained within the cabin versus pressure outside the cabin.

It is well known that because of the multiplicity of instruments required for modern aircraft there has been much effort directed toward combining aircraft instruments or improving the manner of their presentation so that the pilots task of interpretation would be simplified. The present invention is directed toward simplifying the pilot's task in determining whether the proper pressure is being maintained within an aircraft cabin. The cabins of high altitude aircraft are pressurized beginning at a predetermined altitude up to the ceiling of the aircraft. Depending upon the structural strength of the aircraft cabin and the mission that the aircraft is to perform, a predetermined schedule of cabin pressures versus pressure outside the cabin can be determined. FIG. 2 illustrates an example of a predetermined schedule of cabin pressures for an aircraft which commences cabin pressure at 8000 feet altitude, which has a structural limiting differential pressure of 5 pounds per square inch and which has a ceiling of 80,000 feet. Heretofore, in order to maintain such a cabin pressure schedule the pilot was required to read the altitude indicator and the cabin pressure indicator and then relate this data to a curve or table. Attention of the pilot for performing these indicator readings and for applying the data to a curve or table is practically impossible when arduous maneuvers are being performed and when the pilot is flying under emergency situations. The present invention has solved this problem by providing a single instrument which will inform the pilot by the position of a pointer in relationship to a mark whether the cabin pressure is above, below, or exactly on schedule.

An object of the present invention is to provide an indicator for indicating the deviation in pressure within an enclosure from a predetermined schedule of pressures to be maintained within said enclosure.

Another object is to provide an aircraft cabin pressure indicator for indicating the deviation of aircraft cabin pressure from a predetermined schedule of pressures to be maintained within the cabin versus pressure outside the cabin.

A further object is to provide an indicator display to inform a pilot of an airplane equipped with a pressurized cabin whenever the pressure within the cabin is less than or exceeds a scheduled pressure at a predetermined altitude.

Other objects and many of the attendant advantages of this invention will be readily appreciated as the same becomes better understood by reference to the following detailed description when considered in connection with the accompanying drawings wherein.

Figure 1:
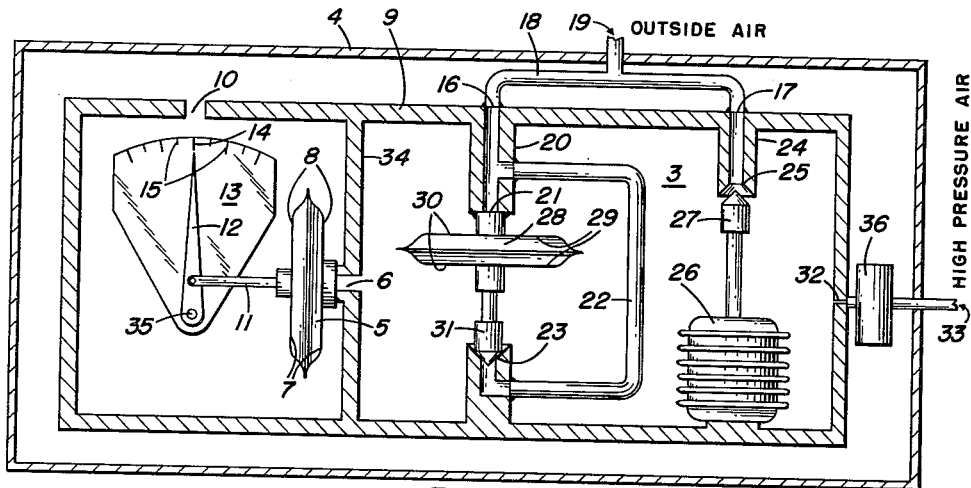
FIG. 1 shows a diagrammatic view of an illustrated embodiment of the invention.
Figure 2:
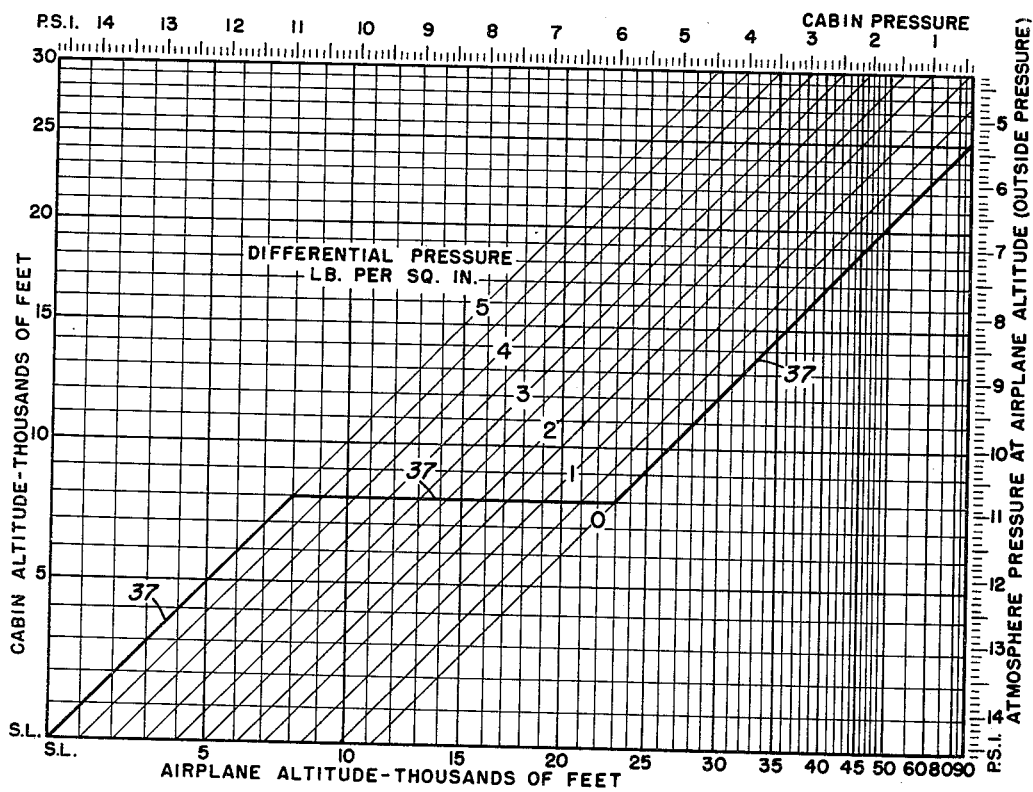
FIG. 2 is an example of a predetermined schedule of pressures to be maintained within an aircraft cabin, the slant lines representing the differential in pressure between pressure in the cabin and pressure outside the cabin in pounds per square inch.

Referring now to the drawings the darkest line 37 shown in FIG. 2 represents a schedule of pressures to be maintained within an aircraft cabin. This particular schedule is for a cabin that is to be pressurized at 8000 feet altitude, which has a structural limiting pressure differential between the pressure inside the cabin and outside the cabin of 5 pounds per square inch and which has an altitude ceiling of 80,000 feet. Under such conditions it will be noted that from sea level to 8000 feet the pressure outside the cabin and pressure inside the cabin are the same, that from 8000 feet to 23,000 feet a constant absolute pressure is maintained within the cabin and that from 23,000 feet up to 80,000 feet the absolute pressure of the cabin is decreased in order to maintain a 5 pound differential between cabin pressure and outside pressure. The device illustrated in FIG. 1 is adapted to operate according to the schedule of pressures set forth in FIG. 2. In this device a control chamber 3 with an opening 6 is fixedly mounted in an aircraft cabin 4. A case 9 is integral with control chamber 3 and has a port 10 for maintaining the pressure in case 9 equal to the pressure within cabin 4. A pressure capsule 5 having an interior side 7 and an exterior side 8 is fixedly mounted on bulkhead 34 of chamber 3 so that the interior side of the capsule 5 is in communication through opening 6 with the pressure within the chamber and the exterior side of the capsule is exposed to the pressure within cabin 4. A link 11 is pivotally attached at one end to capsule 5 and is pivotally attached at its other end to a pointer 12. Pointer 12 is rotatably mounted on a pivot 35, the pivot being fixedly attached to case 9. Dial 13 is fixedly attached to case 9 and has a zero reference mark 14 and marks 15 on each side of mark 14 the latter marks indicating pounds per square inch deviation from mark 14. Pointer 12 is oriented to overlie mark 14 when the pressure within cabin 4 is in conformance with the schedule of pressures as shown in FIG. 2. Chamber 3 has openings 16 and 17 which communicate, through conduit 18, the interior of the chamber with ambient atmospheric pressure 19. Conduit 20 communicates the atmospheric pressure to opening 21, conduits 20 and 22 communicate the atmospheric pressure to valve seat opening 23 and conduit 24 communicates the atmospheric pressure to valve seat opening 25. An evacuated diaphragm pressure capsule 26, fixedly mounted in chamber 3, has a valve stem 27 integral with its movable end. According to the schedule of pressures in FIG. 2, capsule 26 and valve stem 27 are designed to close valve seat opening 25 at a pressure altitude of 8000 feet. Another pressure capsule 28 having an interior side 29 and an exterior side 30 is fixedly mounted to conduit 20 so that opening 21 opens into the interior side 29 of capsule 28. Capsule 28 has a valve stem 31 integral with its movable end which closes valve seat opening 23 and according to the schedule of pressures in FIG. 2 capsule 28 and stem 31 are designed to open valve seat opening 23 when the pressure within chamber 3 exceeds a differential of 5 pounds per square inch over the ambient atmospheric pressure. Chamber 3 has a pressure source opening 32 of a diameter less than .005 of an inch pressure feed by a conduit 33. Conduit 33 is attached to a high pressure source such as an engine compressor section or an independent cylinder of air and has a filter 36 for filtering the air prior to entering opening 32.

In the operation of the device, pointer 12 will overlie zero reference mark 14 if the pressure within cabin 4 is in conformance with the schedule of pressures in FIG.

2. Whenever the pressure within cabin 4 deviates from the schedule of pressures pointer 12 will correspondingly rotate to the left or the right from zero mark 14 depending upon whether the pressure deviation of the cabin from the schedule is a decrease or an increase of pressure over the schedule. According to the schedule, the pressure within the cabin will be the same as ambient atmospheric pressure up to a pressure altitude of 8000 feet at which time capsule 26 causes valve stem 27 to close valve seat opening 25. Chamber 3 is maintained at a pressure equivalent to atmospheric pressure at an 8000 feet altitude by the high pressure air entering through opening 32, any excess over the 8000 feet pressure altitude being bled off through valve 25. Accordingly, at an 8000 feet pressure altitude the pilot must pressurize cabin 4 or the pointer 12 will rotated from the zero reference mark 14. Chamber 3 is maintained at an 8000 feet pressure altitude until an ambient atmospheric pressure of 23,000 feet is reached. At this altitude the pressure differential between the cabin 4 and the atmosphere is 5 pounds per square inch (the structural limit of cabin 4) causing capsule 28 to come into operation. Accordingly, at altitudes from 23,000 feet up to the ceiling of the aircraft, capsule 28 will cause valve stem 31 to bleed pressure from chamber 3 into conduit 22 thus maintaining a 5 pounds per square inch differential pressure between the chamber 3 and ambient atmospheric pressure. It follows that the cabin pressure reacting on the exterior side 8 of capsule 5 must be equal to the chamber pressure acting on the interior side 7 of capsule 5 in order to keep pointer 12 in an overlying position with respect to zero reference mark 14. If there is ever a pressure differential between the cabin 4 and the chamber 3, the pointer 12 will rotate from the zero reference mark 14 indicating to the pilot that the pressure within cabin 4 has deviated from the schedule of pressures set forth in FIG. 2.

Obviously many modifications and variations of the present invention are possible in the light of the above teachings. It is therefore to be understood that within the scope of the appended claims the invention may be practiced otherwise than as specifically described.

What is claimed is:

1. An indicator for indicating the deviation in pressure within an enclosure from a predetermined schedule of pressures to be maintained within said enclosure comprising a control chamber within said enclosure, means for varying the pressure within said control chamber according to a predetermined schedule of pressures, a first pressure capsule within said enclosure having an interior side and an exterior side, means for communicating the pressure within said control chamber to said interior side of said first pressure capsule, said exterior side of said first pressure capsule being exposed to the pressure within said enclosure and display means sensitive to the movement of said first pressure capsule for displaying the deviation of the pressure within said enclosure from said predetermined schedule of pressures.

2. An indicator as claimed in claim 1 wherein said means for varying the pressure within said control chamber comprises a second pressure capsule which is evacuated and which is fixedly mounted within said control chamber, said second evacuated pressure capsule having an exterior side exposed to the pressure within said control chamber, said control chamber having a first valve seat opening communicating with ambient atmospheric pressure, valve means operatively attached to said second pressure capsule and operatively associated with said first valve seat opening for sealing said control chamber from the atmosphere at a predetermined pressure level, a third pressure capsule fixedly mounted within said control chamber, said third capsule having an interior side and an exterior side, means for communicating ambient atmospheric pressure to the interior side of said third capsule, means for communicating ambient atmospheric pressure to a second valve seat opening within said control chamber and valve means operatively attached to said third pressure capsule and operatively associated with said second valve seat opening for bleeding air pressure from said control chamber when the differential pressure between said control chamber and said enclosure exceeds a predetermined amount, and pressure source means operatively associated with said control chamber for introducing a small continuous flow of high pressure air into said control chamber.

3. An indicator as claimed in claim 2 wherein said control chamber has a small aperture, said pressure source means operatively connected to said small aperture, said small aperture having a diameter less than .005 of an inch and means for filtering the air from said high pressure source prior to entering said control chamber through said small aperture.

4. An indicator as claimed in claim 3 wherein said display means comprises a dial fixed in relationship to said control chamber, said dial having a face, a pointer rotatably mounted in relationship to said dial and positioned over said face, a link having one end pivotally attached to said pointer and having its other end pivotally attached to said first pressure capsule, the face of said dial having a zero reference mark and marks on each side of said zero reference mark and said pointer being positioned to overlie said zero reference mark when the pressure in said enclosure is on schedule.

References Cited in the file of this patent
UNITED STATES PATENTS
2,549,673    Del Mar _____ Apr. 17, 1951